United States Patent [19]

Geist et al.

[11] Patent Number: 5,086,090

[45] Date of Patent: Feb. 4, 1992

[54] PROCESS FOR THE PREPARATION OF BINDER DISPERSIONS CAPABLE OF BEING CATHODICALLY DEPOSITED USING CROSSLINKING AGENTS BASED ON POLYISOCYANTES BLOCKED BY HYDROXYL GROUPS

[75] Inventors: Michael Geist, Ludwigshafen, Fed. Rep. of Germany; Klaus Cibura, Southfield, Mich.; Walter Jouck, Münster; Gunther Ott, Münster; Jürgen Sadlowski, Münster; Manfred Dangschaft, Drensteinfurt; Manfred Reimann, Münster, all of Fed. Rep. of Germany

[73] Assignee: BASF Lacke & Farben AG, Münster-Hiltrup, Fed. Rep. of Germany

[21] Appl. No.: 466,437

[22] PCT Filed: Nov. 3, 1988

[86] PCT No.: PCT/EP88/00998

§ 371 Date: Jun. 13, 1990

§ 102(e) Date: Jun. 13, 1990

[87] PCT Pub. No.: WO89/04353

PCT Pub. Date: May 18, 1989

[30] Foreign Application Priority Data

Nov. 11, 1987 [DE] Fed. Rep. of Germany ....... 3738219

[51] Int. Cl.$^5$ .................. C08G 59/40; C09D 5/44
[52] U.S. Cl. .................... 523/414; 523/415; 523/416; 523/417; 523/420
[58] Field of Search ............. 523/414, 415, 416, 417, 523/420

[56] References Cited

U.S. PATENT DOCUMENTS

| 3,799,854 | 3/1974 | Jerabek | 204/181 |
| 3,984,299 | 10/1976 | Jerabek | 204/181 |
| 4,031,050 | 6/1977 | Jerabek | 204/181 |
| 4,115,328 | 9/1978 | Bozzi et al. | 523/456 |
| 4,252,703 | 2/1981 | Patzschke et al. | 260/29.2 EP |
| 4,332,711 | 6/1982 | Kooymans et al. | 523/402 |
| 4,419,467 | 12/1983 | Wismer et al. | 523/420 |
| 4,452,963 | 6/1984 | Moriarity | 528/45 |
| 4,468,307 | 8/1984 | Wismer et al. | 523/414 |
| 4,609,691 | 9/1986 | Geist et al. | 523/416 |
| 4,704,437 | 11/1987 | Kiessling | 523/417 |

FOREIGN PATENT DOCUMENTS

| 0074634 | of 0000 | European Pat. Off. . |
| 0118743 | of 0000 | European Pat. Off. . |
| 0206071 | of 0000 | European Pat. Off. . |
| 2376881 | 4/1978 | France . |

*Primary Examiner*—Paul R. Michl
*Assistant Examiner*—Christopher D. Rogers
*Attorney, Agent, or Firm*—Kenyon & Kenyon

[57] ABSTRACT

The invention relates to a process for the preparation of aqueous dispersions to be further processed to electrocoating paints with baking temperatures below 160° C. and baking times ≦30 minutes, which dispersions contain modified epoxide-amine adducts as binders and polyisocyanates blocked by hydroxyl groups as crosslinking agents.

In this process polyepoxides and compounds containing one or more, preferably 2, hydroxyl groups per molecule are reacted at elevated temperatures in the presence of catalysts to furnish epoxide-containing intermediates.

A solvent or a mixture of solvents is then added with external cooling ahd the solution is boiled under reflux, if necessary in vacuo, until the temperature of the solution drops to 95° C. to 20° C.

Amines are then added onto the epoxide groups which are still present in a free state in the epoxy resin and a dispersion is prepared by adding a water/acid mixture after adding the crosslinking agent or the dispersion is first prepared and the crosslinking agent is added subsequently.

27 Claims, No Drawings

PROCESS FOR THE PREPARATION OF BINDER DISPERSIONS CAPABLE OF BEING CATHODICALLY DEPOSITED USING CROSSLINKING AGENTS BASED ON POLYISOCYANTES BLOCKED BY HYDROXYL GROUPS

The invention relates to a process for the preparation of aqueous dispersions to be further processed to electrocoating paints with baking temperatures below 160° C. and baking times ≦30 minutes, which dispersions contain modified epoxide-amine adducts as binders and polyisocyanates blocked by hydroxyl groups as crosslinking agents.

Cathodic electrocoating is a painting process frequently used particularly for priming, in which water-thinnable synthetic resins carrying cationic groups are deposited on electrically conducting objects with the aid of direct current. The binders which are suitable for the cathodic deposition, contain predominantly amino groups which are neutralized with acids in order to render the binders soluble in water.

A particularly preferred group of binders is represented by the group of binders which are based on modified epoxy resins. Binders of this type are disclosed, for example, in the following patent documents: U.S. Pat. No. 4,031,050, U.S. Pat. No. 3,799,854, U.S. Pat. No. 3,984,299, U.S. Pat. No. 4,252,703, U.S. Pat. No. 4,332,711 and DE-PS 3,108,073.

They are crosslinkable by virtue of admixed polyisocyanates blocked by hydroxyl groups. These crosslinking agents thus contain at room temperature urethane groups (=blocked isocyanate groups). These blocking components are then split off at elevated temperatures and the isocyanate groups are regenerated. Subsequently these isocyanate groups may effect the crosslinking of the binders via the hydroxyl groups and/or the primary and/or secondary amino groups contained therein. Such non-self crosslinking binder systems represent the present state of the art. Their accretion and preparation are described, for example, in DE-PS 3,108,073, particularly in Examples 1 to 5, or in EP 74,634 A2, Example A.

The crosslinking agents used therein react, because of the structure of their blocking components, only at temperatures above 160° C. The method described in the examples can therefore be followed without any difficulties.

However, in recent years the demand has steadily grown for crosslinking agents which become active at considerably lower baking temperatures. This is due in the automotive industry, for example, to the joint use of plastic components in the construction of automobile bodies.

Attempts were therefore made to prepare suitable blocked polyisocyanates as crosslinking agents for reduced baking temperatures. Crosslinking agents of this type are described, for example, in EP 118,743 A1 and in EP 206,071 A2. However, if these crosslinking agents are used instead of the crosslinking agents described above, the resultant paint surface lacks any reproducible properties and exhibits breakdown phenomena and poor flow-out.

It is thus the object of the invention to make available a process which would make it possible, even when using crosslinking agents with low baking temperatures and modified epoxide-amine adducts as binders, to obtain aqueous dispersions which give rise, after being further processed to electrocoating paints, to reproducible surfaces formed by cathodic electrocoating with very good mechanical properties.

This object is achieved according to the invention by a process for the preparation of aqueous binder/crosslinking agent dispersions, wherein (1)
(A) polyepoxides and
(B) compounds which contain one or more, preferably 2, hydroxyl groups attached to aromatic and/or (cyclo)aliphatic molecular fragments per molecule, are reacted in the presence of catalysts at elevated temperatures, preferably between 100° and 180° C., to furnish (C) epoxide-containing intermediates, (2)
(D) a solvent or mixture of solvents is added with cooling by a secondary circuit (for example cooling via cooling coils filled with heat transfer oil or water) and the resultant resin solution is boiled under reflux, if necessary in vacuo, until the temperature of the solution drops to 95° C. to 20° C.;

(3)
(E) amines are added onto the epoxide groups which are still present in the free state in the epoxy resin and either (4a)
these reaction products are dispersed in a water-acid mixture and the crosslinking agent (F) is admixed, or (4b)
the crosslinking agent (F) is mixed with these reaction products and this mixture is dispersed in a water-acid mixture.

In the first stage of the process according to the invention epoxide-containing intermediates are first prepared from the components (A) and (B) in the presence of catalysts.

Any compound whose molecule contains on average more than 1 epoxide group, may be used as the component (A). Preferred compounds are those which contain 2 epoxide groups in the molecule and have a relatively low molecular weight of not more than 750, preferably 350 to 500.

Particularly preferred epoxide compounds are polyglycidyl ethers of polyphenols prepared from polyphenols and epihalohydrins. Bisphenol A may preferably be used as the polyphenol.

Polyglycidyl esters of polycarboxylic acids may also be used. Glycidyl adipate and glycidyl phthalate are typical examples.

Hydantoin epoxides, epoxidized polybutadiene and polyepoxide compounds which are obtained by epoxidation of an olefinically unsaturated alicyclic compound, are furthermore suitable.

Compounds which contain one or more, preferably 2, hydroxyl groups attached to aromatic and/or (cyclo)aliphatic molecular fragments per molecule are used as the component (B).

Compounds which are suitable as the component (B) include both low-molecular and high-molecular compounds.

Suitable low-molecular components (B) are phenolic, aliphatic and/or alicyclic polyfunctional alcohols of a molecular weight below 350.

Examples of these are: Diols, such as ethylene glycol, dipropylene glycol, triglycol, 1,2-propanediol, 1,3-propanediol, 2,2-dimethyl-1,3-propanediol, 2-methyl-2-propyl-1,3-propanediol, 1,2-butanediol, 1,4-butanediol, 2-ethyl-1,4-butanediol, 2-butene-1,4-diol, 1,2-pentanediol, 1,5-pentanediol, 3-methyl-1,5-pentanediol, 1,6-hexanediol, 2-hydroxyethyl hydroxyacetate, 2,2-dimethyl-3-hydroxypropyl 2,2-dimethylhydroxypropionate, 4,4'-methylenebiscyclohexanol and 4,4'-isopropylidenebiscyclohexanol. 2,2-Dimethyl-1,3-propanediol and 3-methyl-1,5-pentanediol are some of the preferred diols.

Examples of suitable higher-molecular components (B) are polyester polyols, polyether polyols or polycaprolactone polyols of various functionality and molecular weight.

The polyalkylene ether polyols suitable as the component (B) corresponds to the general formula:

in which R is hydrogen or an unsubstituted or substituted lower alkyl radical, n is 2 to 6 and m is 3 to 50 or even higher. Examples are poly(oxytetramethylene) glycols and poly(oxyethylene) glycols.

The preferred polyalkylene ether polyols are poly(oxytetramethylene) glycols of a molecular weight in the range from 350 to 1000.

Polyester polyols may also be used as the components (B). The polyester polyols may be prepared by polyesterification of organic polycarboxylic acids or their anhydrides with organic polyols containing primary hydroxyl groups. The polycarboxylic acids and the polyols are usually aliphatic or aromatic dicarboxylic acids and diols.

The diols used for the preparation of the polyesters include alkylene glycols such as ethylene glycol, butylene glycol, neopentylglycol and other glycols such as cyclohexanedimethanol.

The acid component of the polyester consists primarily of low-molecular carboxylic acids or their anhydrides of 2 to 18 carbon atoms in the molecule. Examples of suitable acids are phthalic acid, isophthalic acid, terephthalic acid, tetrahydrophthalic acid, hexahydrophthalic acid, adipic acid, azelaic acid, sebacic acid and glutaric acid. The anhydrides of these acids may also be used, insofar they they exist.

Furthermore, it is also possible to employ polyester polyols, derived from lactones, as the component (B). These products are obtained by the reaction of an ε-caprolactone with a polyol. Such products are described in U.S. Pat. No. 3,169,945.

The polylactone polyols obtained by the reaction are distinguished by the presence of a terminal hydroxyl group and by recurring polyester moieties, derived from the lactone. These recurring molecular moieties may correspond to the formula

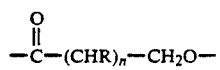

in which n is at least 4, preferably 4 to 6, and the substituent is hydrogen, an alkyl radical, a cycloalkyl radical or an alkoxy radical.

Compounds containing, for example, one or more basic nitrogen atoms may be employed as the catalysts.

Tertiary amines, such as, for example, N,N-dimethylbenzylamine, tributylamine, dimethylcyclohexylamine and dimethyl $C_{12}/C_{14}$-amine ($C_{12}/C_{14}$ represents an aliphatic chain containing 12 to 14 carbon atoms), are preferably used.

The catalyst is usually used in an amount from 0.1 to 2% by weight based on the intermediate produced from the components (A) and (B).

The reaction between the components (A) and (B) is carried out at temperatures between 100° and 190° C., preferably between 100° and 180° C.

In the second stage of the process according to the invention a solvent or a mixture of solvents is added to the resin solution with cooling by a secondary circuit (for example cooling via cooling coils filled with heat transfer oil or water). Solvents preferably to be added are those which cannot react with the epoxide groups still present and/or which can in any case be later added as solvent to the electrocoating paint. Particularly preferred solvents are ketones such as, for example, acetone, methyl ethyl ketone, methyl isobutyl ketone, mesityl oxide; acetates such as, for example, propyl acetate, butyl acetate; ethers such as, for example, dioxane, dibutyl ether; aromatic compounds such as, for example, toluene, xylene, ethylbenzene and mixtures of the solvents. The resin solution is caused to boil under reflux by careful application of a vacuum. Any foaming is brought under control by an appropriate lowering of the vacuum. As the temperature decreases, the pressure is gradually lowered further to achieve uniform boiling. If desired, further solvent may be added while the mixture cools, either continuously or in portions.

In stage (3) of the process according to the invention, primary and/or secondary amines may be employed as the component (E), the secondary amines being particularly preferred components (E).

The amine should preferably be a water-soluble compound. Examples of such amines are monoalkylamines and dialkylamines such as methylamine, ethylamine, propylamine, butylamine, dimethylamine, diethylamine, dipropylamine, methylbutylamine and the like. Alkanolamines, such as, for example, methylethanolamine, diethanolamine and the like, are also suitable. Dialkylaminoalkylamines, such as, for example, dimethylaminoethylamine, diethylaminopropylamine, dimethylaminopropylamine and the like, are also suitable. Low-molecular amines are used in the majority of cases, but it is also possible to employ higher-molecular monoamines.

Polyamines with primary and secondary amino groups may be reacted with the epoxide groups in the form of their ketimines. The ketimines are prepared from the polyamines in a known manner.

The amines may also contain other groups, but these must not interfere with the reaction of the amine with the epoxide group nor must they induce gelling of the reaction mixture.

The reaction between the amine and the compounds containing epoxide groups often commences just by mixing the coreactants. Depending on the desired course of the reaction—particularly to ensure the reaction runs to completion—it is recommended to raise the reaction temperature from 50° to 150° C. during the reaction.

The crosslinking agent (F) for reduced baking temperatures added to the last stage of the process according to the invention is a polyisocyanate blocked with hydroxyl groups. These crosslinking agents are prepared by reacting a polyisocyanate with the corresponding alcohol. The isocyanates may be aliphatic or aromatic, aromatic isocyanates being preferred for crosslinking agents for reduced baking temperatures.

Alkylene isocyanates such as, for example, trimethylene diisocyanate, tetramethylene diisocyanate, pentamethylene diisocyanate, hexamethylene diisocyanate, 1,2-propylene diisocyanate, 1,2-butylene diisocyanate, 2,3-butylene diisocyanate, 1,3-butylene diisocyanate, ethylidene diisocyanate and butylidene diisocyanate as well as cycloalkylene diisocyanates such as, for example, 1,3-cyclopentane diisocyanate, 1,4-cyclohexane diisocyanate, 1,2-cyclohexane diisocyanate and isophorone diisocyanate are typical examples of aliphatic polyisocyanates.

Arylene isocyanates such as, for example, m-phenylene diisocyanate, p-phenylene diisocyanate, 4,4'-diphenyl diisocyanate, 1,5-naphthalene diisocyanate and 1,4-naphthalene diisocyanate, as well as alkarylene isocyanates such as, for example, 4,4'-diphenylenemethane diisocyanate, 2,4- or 2,6-toluylene diisocyanates or mixtures of 2,4-toluylene diisocyanate and 2,6-toluylene diisocyanate, 4,4'-toluidine diisocyanate and 1,4-xylylene diisocyanate as well as substituted aromatic systems such as, for example, dianisidine diisocyanate, 4,4'-diphenyl ether diisocyanate or chlorodiphenylene diisocyanate, 1,3,5-triisocyanatobenzene, 2,4,6-triisocyanatotoluene and 4,4'-diphenyldimethylmethane 2,2',5,5'-tetraisocyanate as well as polymerized isocyanates are typical examples of aromatic isocyanates.

Furfuryl alcohol and its derivatives as well as α-hydroxyketones are employed for blocking the isocyanate group of the crosslinking agent for reduced baking temperatures. Furfuryl alcohol, hydroxyacetone and hydroxybutanone are most particularly preferred.

The crosslinking agent described above may be added directly at the end of stage (3) of the process according to the invention and the resultant mixture then dispersed in a water/acid mixture; however, first dispersing the reaction products from stage (3) in a water/acid mixture and only then adding the crosslinking agent is preferred.

Organic acids such as, for example, formic acid, acetic acid or lactic acid, are used for the preparation of the water/acid mixtures.

The procedure of the process according to the invention for the preparation of aqueous dispersions to be further processed to electrocoating paints with low baking temperatures is elucidated in greater detail in the Examples below. The percentages are percentages by weight, unless indicated otherwise.

EXAMPLE 1

The Example below describes the synthesis of an epoxy resin plasticized with a monophenol, which resin is reacted in a further reaction with a polyamine derivative to furnish an epoxy-amine resin capable of being cathodically deposited. The addition of the crosslinking agent and the preparation of an aqueous dispersion of this mixture is carried out in the last stage.

The crosslinking agent (I) is prepared first as follows:
2208 g of toluylene diisocyanate and 1512 g of methyl isobutyl ketone are introduced in a suitable reaction vessel and heated to 50° C. in an atmosphere of nitrogen. 1176 g of furfuryl alcohol are then run in at such a rate that the temperature does not exceed 70° C. This temperature is maintained for 30 minutes after the end of the addition and 536 g of trimethylolpropane are then added in portions. Here, too, the temperature should not exceed 70° C. The reaction mixture is then heated to 90° C., maintained at this temperature for 1 hour, 168 g of n-butanol are added and the mixture is cooled.

To synthesize the epoxy resin, 7536 g of an epoxy resin based on bisphenol A with an epoxide equivalent weight (EEW) of 188, 1142 g of bisphenol A, 2494 g of dodecylphenol and 588 g of xylene are placed in a 20 kg double-walled reaction vessel which can be heated by means of heat transfer oil and is provided with a stirrer, a reflux condenser, a water separator, an inlet for inert gas and a vacuum connection, and the mixture is heated to 110° C. Traces of water are removed by distillation via a water separator in a continuous cycle by applying a slight vacuum. The reaction mixture is then heated to 130° C. and 44 g of N,N-dimethylbenzylamine are added, when the temperature briefly rises to 150° C. The mixture is then cooled to 130° C. and this temperature is maintained until an EEW of 1240 is reached (about 5 hours). To terminate the reaction, the reaction mixture is cooled via a secondary circuit and 900 g of xylene and 208 g of butylglycol are added in rapid succession. The solution of the resin is caused to boil under reflux by careful application of a vacuum; any foaming is brought under control by an appropriate lowering of the vacuum. When a little later 95° C. are reached, the vacuum is released and 3132 g of a 70% solution of a reaction product obtained from 1 mol of diethylenetriamine and 2 mol of methyl isobutyl ketone (MIBK) in MIBK are added. After the exothermic reaction has subsided, the reaction mixture is heated to 120° C. in the course of 30 minutes and this temperature is maintained for a further 2 hours. A sample of the resin has the following characteristics:

Solids content (30 min. 180° C.): 80%

Base content: 1.47 meq/g of resin solids 1531 g of this resin solution are mixed at room temperature with 750 g of the crosslinking agent (I) and 32 g of glacial acetic acid are added. 1327 g of deionized water are then added in portions with stirring. The mixture is homogenized for a brief period and diluted with further 1359 g of water to a 35% solids content (30 min, 130° C.).

The dispersion is freed from volatile solvents in a subsequent vacuum distillation, the solvent removed by distillation being replaced by equal amounts of water. The dispersion is then filtered.

EXAMPLE 2

The Example below describes the synthesis of an epoxy resin plasticized with neopentylglycol, the reaction of this resin to furnish an epoxide-amine adduct and the dispersion of a crosslinking agent/epoxide-amine adduct mixture in a water/acid mixture.

The preparation of the crosslinking agent (II) is carried out in the same manner as in Example 1, except that hydroxybutanone is used in place of the furfuryl alcohol. The weights are as follows:

| Tolylene diisocyanate | 2208 g |
| --- | --- |
| Hydroxybutanone | 1056 g |
| Trimethylolpropane | 536 g |
| Methyl isobutyl ketone | 1464 g |
| n-Butanol | 164 g |

To synthesize the epoxy resin, 763 g of a commercial epoxy resin based on bisphenol A (epoxide equivalent weight EEW=188), 30 g of methyl isobutyl ketone and 106 g of neopentyl glycol are introduced in a suitable reactor and heated to 130° C. 3 g of dimethylbenzylamine are then added and the temperature is maintained at 140° C. until an EEW of 425 is reached. 271 g of a commercial polyester polyol based on caprolactone (OH value=210) and 2 g of dimethylbenzylamine are then added. The temperature is maintained at 140° C. until an EEW of 1080 is reached. 170 g of toluene are then added with cooling and a vacuum is applied, so that the reaction mixture boils vigorously. The temperature is then lowered to 90° C. and 60 g of methylethanolamine and 78 g of a 70% solution of a reaction product from diethylenetriamine and methyl isobutyl ketone in methyl isobutyl ketone are added. The temperature is raised to 110° C. and maintained for 1 hour. 85 g of n-hexylglycol are then added. This resin solution is dispersed in a mixture of 1049 g of deionized water and 29 g of glacial acetic acid. The reaction mixture is cooled to 60° C. and 885 g of the crosslinking agent (II) are added.

After the mixture has been homogenized for 30 minutes, 1585 g of deionized water are slowly added with stirring. The volatile solvents are then removed by vacuum distillation. The solvent removed is then replaced by equal amounts of water.

Solids content of the dispersion (30 min, 130° C.)—37%

Base content meq/g of resin solids—0.67

COMPARISON EXAMPLE 1

The procedure of Example 2 is followed until an EEW of 1080 is reached. 885 g of the crosslinking agent (II), 60 g of methylethanolamine and 78 g of a 70% solution of a reaction product obtained from diethylenetriamine and methyl isobutyl ketone in methyl isobutyl ketone are then added. The temperature is adjusted to 112° C. and is maintained for 1 hour. 85 g of n-hexylglycol are then added. The solution of the resin is dispersed in a mixture of 1219 g of deionized water and 29 g of glacial acetic acid. The reaction mixture is cooled to 60° C. and a further 1585 g of deionized water are added. The working up of the dispersion is carried out as in Example 2.

Solids content of the dispersion: 36.8%

Base content meq/g of resin solids: 0.68

Electrocoating baths are prepared from the binder dispersions described in Examples 1 and 2 and in the Comparison Example 1, using a gray pigment paste.

To prepare a gray pigment paste, 800 parts of butylglycol are added to 953 parts of a commercial epoxy resin based on bisphenol A (epoxide equivalent weight of 890). The mixture is heated to 80° C. 221 parts of a reaction product obtained from 101 parts of diethanolamine and 120 parts of 80% aqueous lactic acid are then added to the resin solution. The reaction is carried out at 80° C. until the acid value has dropped below 1.

1800 parts of this product are mixed with 2447 parts of deionized water and the mixture is treated with 2460 parts of TiO$_2$, 590 parts of an extender based on aluminum silicate, 135 parts of lead silicate and 37 parts of carbon black. This mixture is ground in a millbase to a Hegman fineness of 5 to 7. 1255 parts of deionized water are then added until the paste reaches the desired consistency.

The electrocoating baths consist of a mixture of:
- 2280 parts of deionized water
- 25 parts of 10% acetic acid
- 1920 parts of aqueous crosslinking agent/epoxide-amine adduct dispersion
- 775 parts of pigment paste The deposition of the paint films is carried out at a bath temperature of 26° C. for 120 seconds. For this purpose zinc-phosphated panels are connected as cathodes and coated. The curing of the deposited films is carried out for 20 minutes in a circulating air oven at temperatures indicated in the table together with the deposition data.

The results of the depositions is summarized in the following tables:

|  | Example 1 | Example 2 | Comparison Example |
|---|---|---|---|
| Deposition data: | | | |
| Deposition voltage (V) | 350 | 320 | 290 (breakdown) |
| Film thickness (μm) | 22 | 34 | 15 |
| Baking temperature (°C.) | 145 | 150 | 145 |
| FORD throwing power (cm) | 22.5 | 21.8 | 20.2 |
| Mechanical properties: | | | |
| Test method | | | |
| Erichsen indentation (mm) | 9 | 7.5 | 5 |
| Crosshatch (0 best, 5 worst) | 0 | 0 | 2 |
| Bending test | pass | pass | fail |
| Impact test (m kg) | 0.69 | 0.92 | 0.05 |
| Flow-out (0 best, 5 worst) | 0.5 | 0 | 4.5 |

COMPARATIVE EXAMPLE 2

The procedure of Example 2 is followed until the EEW of 1080 is reached. 885 g of the cross-linking agent (II) is then added and the reaction batch is brought by means of external cooling to 90° C. 60 g of methylethanolamine and 78 g of a conversion product consisting of diethylene triamine and methylisobutylketone are then added to 70% in methylisobutylketone. The temperature is allowed to rise to 112° C. as a result of the exothermic reaction that sets in and keeps the temperature there for one hour. Then 85 g of n-hexylglycol are added. The resin solution is dispersed in a mixture of 1219 g of deionized water and of 29 g of glacial acetic acid. This is cooled down to 60° C. and an additional 1585 g of deionized water is added. The processing of the dispersion takes place as in example 2.

Solid bodies of the dispersion: 36.8%

Basicity meg/g solid resin: 0.68

From this binding agent dispersion—as described for the binding agent dispersions of examples 1 and 2 as well as for the comparative example—a resist bath of
- 2280 parts deionized water
- 25 parts 10% acetic acid
- 1920 parts aqueous cross-linking agent/epoxide amine adduct dispersion
- 775 parts pigment paste is prepared with a green pigment paste.

The deposition of the resist film takes place at a bath temperature of 26° for 120 seconds. For this purpose, zinc-phosphatized sheet metal is switched (controlled-/operated) and coated as a cathode. The deposited film is hardened for 20 minutes at the temperature in the return-air oven indicated in the table containing the deposition data.

The results of the depositions (separations) are compiled in the following tables:

| Deposition (separation) data: | |
|---|---|
| | Comparative Example 2 |
| Deposition (separation) data: | |
| Deposition voltage (V) | 290 (break) |
| Film thickness (μm) | 15 |
| Stoving temperature (°C.) | 145 |
| FORD grip (cm) | 20 |
| Mechanical Properties: | |
| Testing method | |
| Erichsen cupping (deep drawing) (mm) | 6 |
| Cross hatch (0 best value; 5 worst value) | 2 |
| Binding test | not O.K. |
| Ball-impact test (m kg) | 0.05 |
| Flow (0 best value; 5 worst value) | 5 |

We claim:

1. A process for making an aqueous dispersion of a cathodically electrodepositable binder which is heat-curable upon baking at a temperature below 160° C. for a time of 30 minutes or less, comprising:
   (a) reacting a polyepoxide and a compound containing one or more hydroxyl groups attached to an aromatic or (cyclo)aliphatic fragment in the presence of a catalyst at an elevated temperature to produce an epoxy-group containing intermediate;
   (b) adding a solvent with external cooling to form a resin solution;
   (c) boiling the resin solution at reflux until the solution temperature drops to 20° C. to 95° C.,
   (d) adding an amine to the solution to form an epoxy-amine adduct,
   (e) dispersing the epoxy-amine adduct in a water/acid mixture, and
   (f) adding a crosslinking agent which is blocked by hydroxyl groups to the water acid mixture to form the aqueous dispersion.

2. A process for making an aqueous dispersion of a cathodically electrodepositable binder which is heat curable upon baking at a temperature below 160° C. for a time period of 30 minutes or less, comprising:
   (a) reacting a polyepoxide and a compound containing one or more hydroxyl groups attached to an aromatic or (cyclo)aliphatic fragment in the presence of a catalyst at an elevated temperature to produce an epoxy-group containing intermediate;
   (b) adding a solvent with external cooling to form a resin solution;
   (c) boiling the resin solution at reflux until the solution temperature drops to 95° C. to 20° C.,
   (d) adding an amine to the solution to form an epoxy-amine adduct,
   (e) adding a crosslinking agent blocked by hydroxyl groups to the amine-epoxy adduct, to form a mixture, and
   (f) dispersing the mixture in a water/acid mixture to form the aqueous dispersion.

3. The process a claimed in claim 1 or 2, wherein furfuryl alcohol or a derivative thereof is used as a blocking agent for the crosslinking agent.

4. The process as claimed in claim 1 or 2 wherein an α-hydroxyketone is used as a blocking agent for the crosslinking agents.

5. The process of claim 1 or 2 wherein the polyepoxide and hydroxyl-group containing compound are reacted catalytically at 100° C. to 180° C.

6. The process of claim 4 wherein the α-hydroxyketone comprises hydroxyacetone or hydroxybutanone.

7. The process as claimed in claim 1 or 2 wherein the solvent is non-reactive with the intermediate.

8. The process as claimed in claim 1 or 2 wherein the resin solution is cooled to a temperature greater than or equal to 50° C.

9. The process as claimed in claim 1 or 2 wherein the solvent is removed in vacuo at a temperature below 65° C. after preparation of the aqueous dispersion.

10. The process as claimed in claim 3, wherein the solvent used is non-reactive with epoxide groups.

11. The process as claimed in claim 4, wherein the solvent used does not react with epoxide groups present in the intermediate.

12. The process as claimed in claim 3, wherein the resin solution is cooled to a temperature greater than or equal to 50° C.

13. The process as claimed in claim 4, wherein the resin solution is cooled to a temperature greater than or equal to 50° C.

14. The process as claimed in claim 7, wherein the resin solution is cooled to temperatures greater than or equal to 50° C.

15. The process as claimed in claim 3, wherein the solvent is removed in vacuo at temperatures below 65° C. after preparation of the aqueous dispersion.

16. The process as claimed in claim 4, wherein the solvent is removed in vacuo at temperatures below 65° C. after preparation of the aqueous dispersion.

17. The process as claimed in claim 7, wherein the solvent is removed in vacuo at temperatures below 65° C. after preparation of the aqueous dispersion.

18. The process as claimed in claim 8, wherein the solvent is removed in vacuo at temperatures below 65° C. after preparation of the aqueous dispersion.

19. The process as claimed in claim 10, wherein the resin solution is cooled to temperatures greater than or equal to 50° C.

20. The process as claimed in claim 11, wherein the resin solution is cooled to a temperature greater than or equal to 50° C.

21. The process as claimed in claim 10, wherein the solvent is removed in vacuo at temperatures below 65° C. after preparation of the aqueous dispersion.

22. The process as claimed in claim 11, wherein the solvent is removed in vacuo at temperatures below 65° C. after preparation of the aqueous dispersion.

23. The process as claimed in claim 12, wherein the solvent is removed in vacuo at temperatures below 65° C. after preparation of the aqueous dispersion.

24. The process as claimed in claim 13, wherein the solvent is removed in vacuo at temperatures below 65° C. after preparation of the aqueous dispersion.

25. The process as claimed in claim 14, wherein the solvent is removed in vacuo at temperatures below 65° C. after preparation of the aqueous dispersion.

26. The process as claimed in claim 19, wherein the solvent is removed in vacuo at temperatures below 65° C. after preparation of the aqueous dispersion.

27. The process as claimed in claim 20, wherein the solvent is removed in vacuo at temperatures below 65° C. after preparation of the aqueous dispersion.

* * * * *